US012718320B2

(12) United States Patent
Andrew

(10) Patent No.: US 12,718,320 B2
(45) Date of Patent: Aug. 25, 2026

(54) X-RAY SUPER-RESOLUTION ASSESSMENT VIA SPATIAL FILTERING

(71) Applicant: Carl Zeiss X-Ray Microscopy, Inc., Dublin, CA (US)

(72) Inventor: Matthew Andrew, Dublin, CA (US)

(73) Assignee: CARL ZEISS X-RAY MICROSCOPY, INC., Dublin, CA (US)

( * ) Notice: Subject to any disclaimer, the term of this patent is extended or adjusted under 35 U.S.C. 154(b) by 281 days.

(21) Appl. No.: 18/680,854

(22) Filed: May 31, 2024

(65) Prior Publication Data

US 2025/0371656 A1 Dec. 4, 2025

(51) Int. Cl.
*G06T 3/4046* (2024.01)
*G06T 5/20* (2006.01)

(52) U.S. Cl.
CPC .............. *G06T 3/4046* (2013.01); *G06T 5/20* (2013.01); *G06T 2207/10116* (2013.01); *G06T 2207/20081* (2013.01)

(58) Field of Classification Search
CPC ..................... G06T 3/4046; G06T 5/20; G06T 2207/10116; G06T 2207/20081
See application file for complete search history.

(56) References Cited

U.S. PATENT DOCUMENTS 10,635,943 B1 * 4/2020 Lebel ..................... G06N 3/084
11,403,791 B2 * 8/2022 Lee ........................ A61B 6/032
11,574,184 B2 * 2/2023 Cachovan ............... G06T 19/00
12,062,153 B2 * 8/2024 Lu ............................. G06T 5/60
12,548,221 B2 * 2/2026 Carmi ..................... G06T 12/10
(Continued)

FOREIGN PATENT DOCUMENTS

EP 3675043 A1 * 7/2020 ............. G06T 12/30

OTHER PUBLICATIONS

Lee et al., 2019, "High quality imaging from sparsely sampled computed tomography data with deep learning and wavelet transform in various domains" (pp. 104-115) (Year: 2019).*
(Continued)

*Primary Examiner* — Manav Seth
(74) *Attorney, Agent, or Firm* — NIXON PEABODY LLP; Jeffrey L. Costellia

(57) ABSTRACT

A technique is disclosed for analyzing and displaying the extent to which the images and structures inferred by a physically seeded multiscale network correspond to genuine resolution improvement and the extent to which they correspond to the hallucination of realistic looking structures. A selected reconstruction generated using a trained neural network is compared against a baseline representation (e.g., a baseline reconstruction) by calculating image similarity metrics between progressing spatially filtered versions of selected reconstruction. As the amount of spatial filtering increases, at some point the image similarity metrics will reach an extrema (e.g., a lowest distance between the images). At that extrema, the parameter(s) of the spatial filter can be used to identify a resolution score (e.g., a length scale) associated with that extrema. The resolution score is indicative of an amount of resolution recovery associated with the trained neural network with respect to the baseline.

20 Claims, 4 Drawing Sheets

(56) References Cited

U.S. PATENT DOCUMENTS

| | | | | |
|---|---|---|---|---|
| 2019/0147589 | A1* | 5/2019 | Zhou | G06T 5/60 382/131 |
| 2020/0394758 | A1* | 12/2020 | Wang | A61B 6/5211 |
| 2023/0245274 | A1* | 8/2023 | Omi | G06T 7/0012 382/128 |
| 2024/0362753 | A1* | 10/2024 | Park | G06T 5/60 |
| 2025/0111473 | A1* | 4/2025 | Andrew | G06T 3/4046 |

OTHER PUBLICATIONS

Pelt et al., 2016, "Improved tomographic reconstruction of large-scale real-world data by filter optimization" (pp. 1-14) (Year: 2016).*

Lyra et al., 2011, "Filtering in SPECT image reconstruction" (pp. 1-14) (Year: 2011).*

Wang et al., 2006, "Penalized Weighted Least-Squares Approach to Sinogram Noise Reduction and Image Reconstruction for Low-Dose X-Ray Computed Tomography" (pp. 1272-1283). (Year: 2006).*

Extended European Search Report for Application No. 25179265.1-1218 dated Nov. 3, 2025 (4 pages).

Wai Yan Ryana Fok et al: "Deep learning in computed tomography super resolution using multi-modality data training", Medical Physics, AIP, Melville, NY, US, vol. 51, No. 4, Nov. 16, 2023 (Nov. 16, 2023), pp. 2846-2860, XP072614045, ISSN: 0094-2405, DOI: 10.1002/MP.16825.

Andrew Matthew et al: "Fully automated deep-learning-based resolution recovery", Proceedings of the SPIE, SPIE, US, vol. 12304, Oct. 18, 2022 (Oct. 18, 2022), pp. 123041Q-123041Q, XP060166584, ISSN: 0277-786X, DOI: 10.1117/12.2647272 ISBN: 978-1-5106-5738-0.

* cited by examiner

X-RAY SUPER-RESOLUTION ASSESSMENT VIA SPATIAL FILTERING

TECHNICAL FIELD

The present disclosure relates to X-ray imaging generally and more specifically to evaluating and improving neural-network-improved reconstructions.

BACKGROUND

X-ray Microscopy Imaging is a field of imaging that is used to acquire imaging data for many different types of samples across many different use cases. X-ray Microscopy Imaging has found uses in biology (e.g., imaging biomaterials, soft tissues, and the like), material science (e.g., imaging the internal microstructure of a material), manufacturing (e.g., non-destructively imaging internal components), and many other fields. Individual images (e.g., projections) can be acquired by directing radiation from an X-ray source, through a sample, towards a detector. Multiple projections can be acquired for a single sample by rotating the direction of travel of the X-ray radiation with respect to the sample (e.g., rotating the X-ray source and detector with respect to the sample). Often, the acquired imaging data (e.g., containing multiple projections) is used to generate a three dimensional reconstructed volumes of the sample that was imaged, such as through the use of computed tomography (CT).

While X-ray Microscopy provides many benefits, one challenge is that of scale. Often, the resolution required to image fundamental structures comes at the expense of a field of view required to image an entire sample. Furthermore, high-resolution tomography acquisition tends to be extremely slow, especially for interiors of large samples. While high-resolution detectors exist, they are typically significantly less sensitive than low-resolution detectors, especially to high-energy X-rays. Also, high-resolution sources are typically significantly less powerful than low-resolution sources. When interior tomography occurs within a large sample, the relatively large amount of material outside the field of view can project into the volume, effectively adding noise and artifacts. The non-imaged regions of the sample can act as an X-ray filter, biasing the X-ray spectrum to higher energies, which can be especially problematic when interior tomography occurs within a large sample. Since the high-resolution detectors are not as sensitive to high-energy X-rays, the resultant projections can be noisy. Even if multiple imaging parameters and/or equipment are capable of generating images with the same resolution, the specific imaging parameters and/or equipment may result in images of different quality, such as images with better or worse sharpness, noise, artifacts, point spread function, and the like.

When imaging is required of a large field of view, there are traditionally only two options. The first option is to rely on low-image-quality acquisition techniques, which can achieve a large field of view, but at the expense of image quality (e.g., at the expense of image resolution, image sharpness, image noise, and the like), which can make important features undistinguishable or can otherwise be undesirable. If a high-quality image is required of a large field-of-view, large area composite projections can be created and subsequently reconstructed from two or more projections offset with respect to each other. However, such acquisition modes are generally prohibitively slow and unreliable.

More recently, the use of deep-learning-based image processing techniques have enabled low-quality image data to be processed to achieve high-quality outputs (e.g., higher resolution, fewer artifacts, and/or reduced noise). As a result, imaging can be achieved that has both high-quality and a large field-of-view. However, use of these types of deep-learning-based image processing techniques can have other undesirable consequences.

Image resolution is typically defined in terms of a modulation transfer function (MTF), which corresponds to the frequency domain expression of an image point spread function (PSF). Generally speaking, an image MTF can be truly measured only on known structures (such as resolution targets), or in specific cases can be inferred from specific metrics on images. For simple or linear imaging processes, the MTF can be estimated through an examination of the frequency content of the images. This examination becomes unreliable, however, when the frequency content is modulated through the presence of other high frequency content, such as noise or nonlinear imaging artifacts. In the case of deep-learning-based image inference, this type of analysis is particularly problematic, as the neural network can introduce significant high-frequency content through hallucination, which can confuse or confound analysis efforts. As such, objectively determining resolution improvement (e.g., true recovery of high frequency features, instead of a mere increase in sharpness by increasing the high frequency content) by a neural network can be problematic, which can stifle research and improvements in the field. Additionally, it can be especially difficult to compensate for hallucinations introduced by neural networks.

There is a need for improved image processing techniques to address these and other deficiencies.

BRIEF SUMMARY

In one aspect, a method, includes receiving an improved reconstruction of a subject, the improved reconstruction generated by supplying a trained neural network with first imaging data acquired of the subject, the first imaging data acquired using an electromagnetic radiation imager. The method also includes receiving a baseline representation of the subject. The baseline representation is a representation of the subject at a minimal level of artefacts (i.e. lowest noise, highest resolution), whereas the "original" representation is the low resolution dataset from the first imaging data. The improved reconstruction is a representation obtained from the first imaging data. The baseline representation needs to be noise free to pass through DeepRecon (reconstruction technology algorithm by ZEISS based on U.S. Pat. No. 11,972,511). The method also includes calculating a plurality of image similarity metrics between the baseline representation and the improved reconstruction, where, for each of the plurality of image similarity metrics, calculating the plurality of image similarity metrics includes applying a spatial filter to the improved reconstruction based at least in part on a filter parameter, calculating an image similarity metric between the baseline representation and the filtered improved reconstruction, and adjusting the filter parameter. The method also includes determining a selected filter parameter associated with an extrema image similarity metric of the plurality of image similarity metrics representative of a closest similarity between the baseline representation and the filtered improved reconstruction. The method also includes generating a resolution score associated with the selected filter parameter.

The method may also include where the resolution score is a length scale value associated with the selected filter parameter. The method may also include where the improved reconstruction is a volumetric reconstruction. The method may also include where the spatial filter is a low-pass filter. The method may also include where applying the spatial filter includes applying a Gaussian filter to the improved reconstruction, the filter parameter including a variance of the Gaussian filter. The method may also include where the image similarity metric is an image similarity distance, and where the extrema image similarity metric is a minimum image similarity metric of the plurality of image similarity metrics. The method may also include where the image similarity metric includes (i) a mean square error; (ii) a mean absolute error; (iii) a normalized correlation; (iv) a pattern intensity; (v) a measurement of mutual information; or (vi) any combination of (i) to (v).

The method may also include where the spatial filter is a band-pass filter. The method may also include where applying the spatial filter includes applying a difference of Gaussians (DoG) filter, the filter parameter including a pair of variances of the DoG filter. The method may also include where the baseline representation is a volumetric reconstruction generated from second imaging data acquired of the subject, the second imaging data having a higher resolution and low noise than the first imaging data. The method may also include where the first imaging data is x-ray imaging data and the electromagnetic radiation imager is an x-ray imager.

The method may also include associating the resolution score with the trained neural network, comparing the resolution score associated with the trained neural network with an additional resolution score associated with an additional trained neural network, and selecting the trained neural network for future use based at least in part on the comparison of the resolution score and the additional resolution score. The method may also include associating the resolution score with the trained neural network, determining, for each of a plurality of additional trained neural networks, a respective additional resolution score, and presenting a display, the display including an indication of the resolution score in association with an indication of the trained neural network, and, for each of the plurality of additional resolution scores, an indication of the respective additional resolution score in association with an indication of the respective additional trained neural network. The method may also include presenting a display, the display including a graphical depiction of the plurality of image similarity metrics.

Aspects of the present disclosure include a system comprising: a control system including one or more processors; and a memory having stored thereon machine readable instructions; wherein the control system is coupled to the memory, and the method(s) above is (are) implemented when the machine executable instructions in the memory are executed by at least one of the one or more processors of the control system.

Aspects of the present disclosure include a computer-program product tangibly embodied in a non-transitory machine-readable storage medium, including instructions configured to cause a data processing apparatus to perform the method(s) above.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
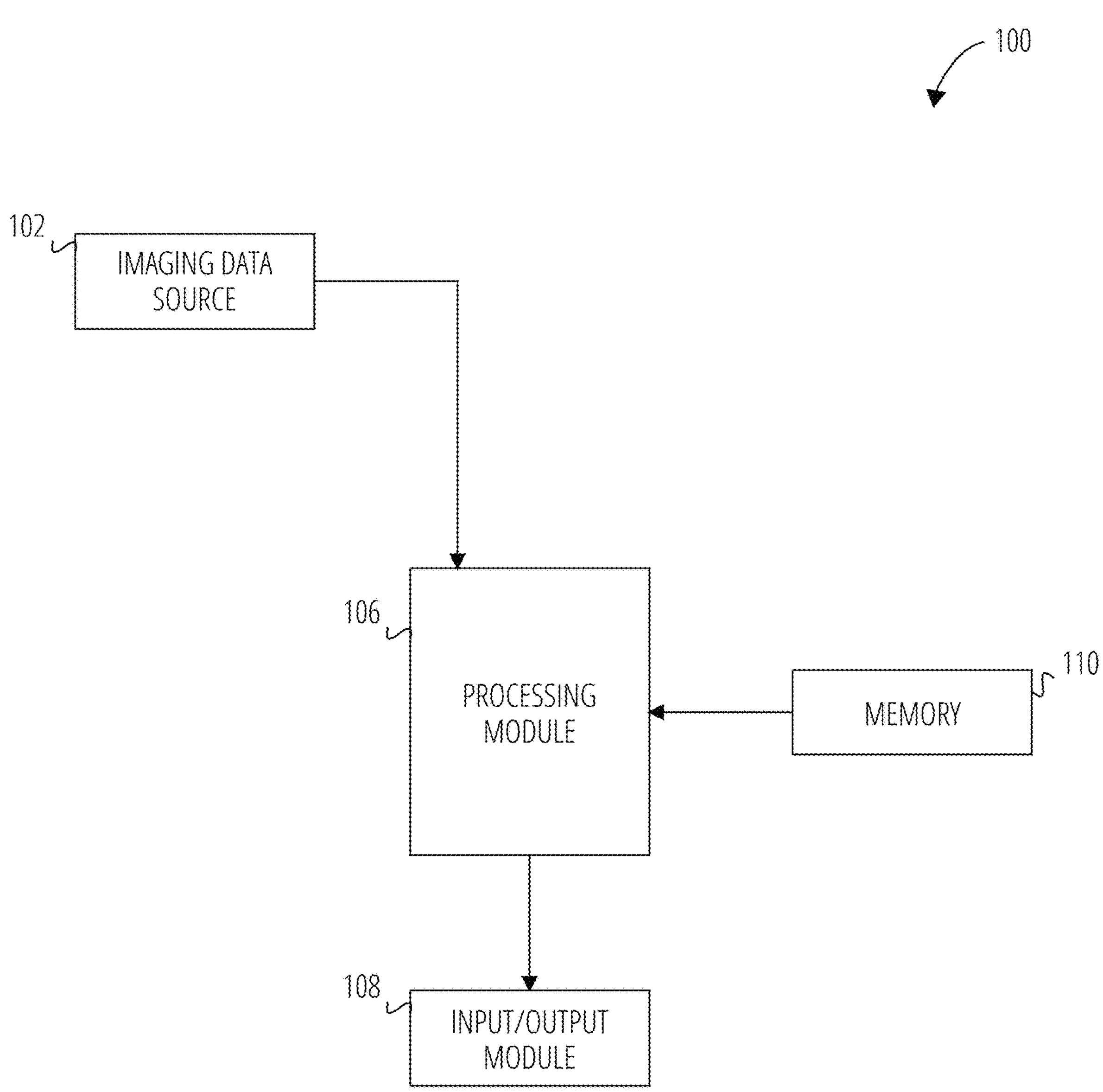
FIG. 1 is a schematic diagram depicting an imaging data processing system, according to certain aspects of the present disclosure.

Certain aspects and features of the present disclosure relate to a technique for analyzing and displaying the extent to which the images and structures inferred by a physically seeded multiscale network correspond to genuine resolution improvement and the extent to which they correspond to the hallucination of realistic looking structures. A selected reconstruction generated using a trained neural network is compared against a baseline representation (e.g., a baseline reconstruction) by calculating image similarity metrics between progressing spatially filtered versions of selected reconstruction. As the amount of spatial filtering increases, at some point the image similarity metrics will reach an extrema (e.g., a lowest distance between the images). At that extrema, the parameter(s) of the spatial filter can be used to identify a resolution score (e.g., a length scale) associated with that extrema. The resolution score is indicative of a resolution of the recovered image with respect to the baseline. The phrase "amount of resolution recovery" indicates a relation to the original reconstruction.

During X-ray Microscopy procedures, radiation is emitted from one or more emitters (X-ray sources) and is directed to one or more detectors. A sample (e.g., a subject being analyzed) located between the emitter(s) and detector(s) can affect the amount of radiation received by the detector(s), such as by absorbing, scattering, reflecting, or otherwise affecting the radiation incident on and/or passing through the sample. The resultant information collected by the detector (s) can be known as data or imaging data. As used herein, the terms scan or scanning can refer to the acquisition of imaging data, optionally during movement of the sample with respect to the emitter(s) and/or detector(s). As used herein, the term computed tomography (CT) is intended to include the use of X-ray imaging data to generate a three-dimensional reconstructed volume of a sample. A three-dimensional reconstructed volume can be a data set indicative of the three-dimensional structure or a three-dimensional image of the sample (e.g., a three-dimensional image composed of voxels, or other volumetric representation of sample structure). X-ray imaging is generally non-destructive to the sample.

Certain aspects and features of the present disclosure can be used to generate and analyze improved imaging data, such as improved two-dimensional images, improved three-dimensional volumes (e.g., improved CT reconstructed volumes), or other improved images or volumes (e.g., laminography reconstructions) reliant upon the imaging data. Deep neural networks (DNNs) can be used to generate or improve imaging data or a reconstructed volume, but can also introduce hallucinations. Certain aspects and features of the present disclosure relate to generating a relative measure of resolution for outputs of such DNNs despite any introduced hallucinations.

A reconstruction (e.g., a 2-dimensional image or 3-dimensional volumetric representation) can exhibit many spatial frequencies, with higher spatial frequencies representative of smaller features in the reconstruction and larger spatial frequencies representative of larger features in the reconstruction.

A spatial filter applied to a reconstruction can remove certain spatial frequencies from the reconstruction. For example, a low-pass filter can remove high-frequency spatial content, such as small features. An example of a low-pass filter is a Gaussian filter, which involves convolving a reconstruction with a Gaussian kernel. The Gaussian filter generates a blurring effect around each pixel according to its parameters. In a 2-dimensional example, the Gaussian kernel can be represented according to the equation:

$$G(x, y) = \frac{1}{2\pi\sigma^2} e^{-\frac{x^2+y^2}{2\sigma^2}}$$

where x,y is the coordinate of the pixel being affected and σ is the standard deviation (also referred to as the sigma) of the Gaussian distribution.

Generally, the variance ($\sigma^2$) is adjusted to control the variance around a mean value of the Gaussian distribution, which determines the extent of the blurring effect. In some cases, other parameters (e.g., kernel size) can be used to adjust the filter. At a low variance, a small amount of blurring may be present, which equates to reduction or removal of spatial frequencies above a certain cutoff frequency. As the variance increases, the amount of blurring increases, which equates adjusting this cutoff frequency lower to remove even more spatial frequencies. Thus, a spatial low-pass filter can be adjusted through a range of cutoff frequencies (e.g., from very little blur to high blur).

Similar effects can be achieved with band-pass filters (e.g., a difference of Gaussians (DoG) filter). A DoG filter can operate by subtracting a first Gaussian-filtered reconstruction from a second Gaussian-filtered reconstruction, the first Gaussian-filtered reconstruction having a sigma that is smaller than the sigma of the second Gaussian-filtered reconstruction. As each sigma is associated with a spatial cutoff frequency, the resultant output of the DOG filter is a reconstruction with spatial data below a lower cutoff frequency and above a higher cutoff frequency being removed or reduced, thus leaving information between the two cutoff frequencies and achieving a band-pass-filtered reconstruction of the original reconstruction.

Certain aspects and features of the present disclosure relate to calculating image similarity metrics for a selected reconstruction across various iterations of filtered versions of the reconstruction as filtered according to different filter parameter(s). An image similarity metric is any metric capable of representing an amount of difference or similarity between a first reconstruction and a second reconstruction. Examples of suitable image similarity metrics include (i) a mean square error (MSE); (ii) a mean absolute error (MAE); (iii) a normalized correlation; (iv) a pattern intensity; (v) a measurement of mutual information; or (vi) any combination of (i) to (v).

For example, the mean square error can be the sum of the squared difference between the two reconstructions. The lower the MSE, the more similar the reconstructions are to one another. Any suitable image similarity metric can be calculated.

According to certain aspects and features of the present disclosure, for a given a reconstruction (e.g., an improved reconstruction that has been improved by being processed by a trained neural network), image similarity metrics can be calculated for multiple filtered versions of the reconstruction as compared to a baseline representation. Each of the filtered versions of the reconstruction can be filtered using different filter parameters, thus rendering versions of the original reconstruction, each with a different spatial frequency suppression. For example, a series of image similarity metrics can be calculated for a reconstruction starting with very minimal Gaussian blur, then proceeding with increasing blur until a stopping point has been reached (e.g., until a preset number of datapoints have been acquired, until a preset filter parameter has been reached, and/or until the previous n datapoints behave in a certain fashion, such as when the previous n datapoints show that the image similarity metrics have reached an extrema and are now moving away from that extrema).

At low levels of blur, only very high spatial frequencies of the reconstruction will be suppressed. However, as the blur increases, the spatial frequencies being suppressed will become larger and lower. Thus, at low levels of blur, the distance between the reconstruction and the baseline will be high, and dominated by neural-network-induced hallucination. At high levels of blur, the distance between the reconstruction and the baseline will also be high, as the lower frequencies are not adequately recovered. However, some medium level of blur will achieve a closest distance between the reconstruction and the baseline. At this extrema, the amount of blur applied corresponds to the blur that should be applied to the reconstruction to best approximate the baseline (e.g., to best approximate the true structure function of the subject). The extrema may be a minimum or a maximum, depending on the type of image similarity metric used. When an image distance metric is used, the extrema would be a minimum, corresponding to a minimum distance between the reconstruction and the baseline. When a degree of similarity metric is used, the extrema would be a maximum, corresponding to a maximum amount of similarity between the reconstruction and the baseline. As used herein, the term image similarity metric is intended to include any suitable measure of image similarity, including both image distance metrics and degree of similarity metrics. Often, the image similarity metric will be an image distance metric, and thus the extrema will be a minimum. This behavior is appropriate for differential gaussian filtering. In a case when using a bandpass filter (DoG), instead of minima, one will find low image similarities at high frequency passes, and high similarities at low frequencies. This is because the highest frequencies will be uncorrelated but the lowest frequencies will be correlated.

Once an extrema is identified, the spatial filter parameter (s) used to generate the version of the reconstruction at that extrema can be used to determine a resolution score. The resolution score is an objective score representative of a degree to which the neural network that generated the reconstruction accurately recovers resolution. For example, the filter parameter(s) can define a length scale that can be used to identify at what resolution this particular reconstruction (and thus this particular trained neural network) is accurately resolving features. For example, increasing sigma values for a Gaussian filter correspond to increasing spatial length scales. Thus, higher sigma values would correspond to larger length scales, and thus lower resolution. However, lower sigma values would correspond to lower length scales, and thus higher resolution. In some cases, a resolution score is based on the length scale value at that extrema. In some cases, a resolution score can be an indication of one neural network's relative position to the other neural networks. For example, a set of ten neural networks may be merely ranked one through ten based on where their extrema fall along the tested filter parameter values (e.g., one may be the lowest value of sigma and ten may be the highest). Any suitable resolution score can be calculated.

The baseline representation to which a reconstruction is compared is normally a reconstruction, such as a best available reconstruction. However, in some cases, the baseline representation can be a model or synthetic reconstruction of a known structure. For example, an accurate volumetric model of a test subject (e.g., a digital test subject or a known test subject) can be forward projected into a projection dataset which can be applied to multiple different trained neural networks to see which trained neural network performs best. Each trained neural network will output its own reconstruction, each of which can be compared to the volumetric model to determine a resolution score.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting an imaging data processing system 100, according to certain aspects of the present disclosure. The imaging data processing system 100 (e.g., control system) can include an imaging data source 102 that provides imaging data to a processing module 106. The imaging data source 102 can be any suitable source of imaging data, such as an imager (e.g., an imaging machine, such as an X-ray microscope or a CT scanner), a database of imaging data, a local memory storing imaging data, a removable memory storing imaging data, or the like. Certain aspects and features of the present disclosure are especially useful when the imaging data source 102 is an imager, such as an X-ray microscope.

The processing module 106 can process imaging data from the imaging data source 102. In some cases, the processing module 106 can control the imaging data source 102. The processing module 106 can use the imaging data to train a neural network, such as an artificial neural network (ANN) (e.g., a deep neural network (DNN), a convolutional neural network (CNN), or the like), and/or use such a trained neural network to process imaging data or a reconstructed volume into improved imaging data or an improved reconstructed volume. The processing module 106 can also carry out reconstruction of imaging data (e.g., raw imaging data or improved imaging data) to generate reconstructed volumes (e.g., converting a set of acquired projections into a three-dimensional reconstructed volume). In some cases, the processing module 106 can access a pre-trained neural network from a memory 110, which can be applied as-is or can be further trained. In some cases, the pre-trained neural network can be a neural network that is generated using a federated learning technique, in which multiple trained neural networks can be collected and combined to generate a collaborative neural network that is distributed as the pre-trained neural network. In such cases, each pre-trained neural network can be associated with the same category of sample and/or the same or similar acquisition parameters, and the pre-trained neural network accessed by the processing module 106 can be accessed based on a provided category and/or set of acquisition parameters.

In some cases, a neural network trained using a processing module 106 can be stored in the memory 110, optionally with additional information associated with the sample and/or the scan. Additional information associated with the sample can include identification information (e.g., a unique identifier or a description), category information (e.g., an indication as to the category to which the sample belongs), imaging data or a reconstructed volume of the sample generated using the neural network, imaging data or a reconstructed volume of a standardized set of imaging data (e.g., of a generic standardized sample or a specific standardized sample selected to be similar to the sample, such as having the same category). Additional information associated with the scan can include imager identification information (e.g., a model number of the X-ray imager, a model number or type of the X-ray source(s) and/or detector(s), and the like), scan recipe information (e.g., information about one or more parameters used in the scanning of the sample), and the like. Any information stored in the memory 110 in association with a pre-trained neural network can be used to help select a pre-trained neural network to use when processing imaging data from a new sample.

In some cases, the processing module 106 can access a set of candidate pre-trained neural networks from memory 110. This set of candidate pre-trained neural networks contains multiple trained neural network that differ from one another in various fashions. For example, a first neural network may be trained on single-resolution imaging data; a second neural network may be trained on multiple resolutions of imaging data of the same subject; a third neural network may operate by first generating a reconstruction on a low resolution grid, training the neural network on that reconstruction, then interpolating to a higher resolution grid; a fourth neural network may operate by first generating a reconstruction on a high resolution grid and then training the neural network on that reconstruction; fifth and sixth neural networks may be the same except trained with input data of different resolutions; seventh and eight neural networks may be the same except trained to output data at different resolutions. Any suitable combinations of parameters used to train and/or use a neural network can be used to generate candidate pre-trained neural networks, including different combinations of order of operations for handling the input data, any intermediate data, and output data.

As described in further detail herein, the processing module 106 can take input imaging data and process it using multiple candidate pre-trained neural networks to generate multiple reconstructions. Each of these reconstructions can be compared to a baseline (e.g., baseline reconstruction) to determine which of the candidate pre-trained neural networks performs the best (e.g., obtains the best resolution score, or obtains a suitable high resolution score with decreased computational time or expense). In some cases, the processing module 106 can make adjustments to parameters of a candidate pre-trained neural network to split a single candidate pre-trained neural network into multiple versions, each of which can be compared to one another or to other candidate pre-trained neural networks to identify a best-performing neural network.

The processing module 106 can receive imaging data from the imaging data source 102. In some cases, the processing module 106 can control an imager to generate the imaging data, although that need not always be the case.

The memory 110 can be implemented as a single storage device or across multiple storage devices. In some cases, the memory 110 can be stored on a memory accessible locally or remotely (e.g., accessible via a network such as a local area network, a wide area network, a cloud network, or the Internet).

An input/output module 108 can be coupled to the processing module 106 to receive user input and provide output to a user. Any suitable input/output devices can be implemented in the input/output module 108, such as a keyboard, a mouse, a display (e.g., computer monitor), a touchscreen, light emitting diodes (LEDs) or other light sources, buttons, and the like. The processing module 106 can present reconstructions (e.g., reconstructed volumes), resolution scores, image similarity metrics, neural network information, and/or further information derived therefrom to a user via the input/output module 108. In some cases, the input/output module 108 can store imaging data, a reconstructed volume, and/or a selected neural network (e.g., on a local memory, removable memory, or network-accessible memory). In some cases, a neural network selected using a processing module 106 can be stored in association with the imaging data and/or reconstruction.

In some cases, any of the imaging data source 102, the processing module 106, the input/output module 108, and the memory 110 can be incorporated into one or more housings in any suitable combination. Any combination of one or more of the imaging data source 102, the processing module 106, the input/output module 108, and the memory 110 can be implemented locally (e.g., on the same device as one another or on devices coupled by a bus or local area network) or remotely (e.g., via a wide area network, the Internet, or a cloud network). In an example, a processing module 106 can be implemented on a user's laptop computer, the imaging data source 102 can be implemented on a cloud-based health record database (e.g., one or more servers accessible via the Internet), and the memory 110 can be implemented on a separate cloud-based analysis database (e.g., one or more servers accessible via the Internet).

In another example, the processing module 106 can be incorporated into an imaging data source 102, such as a computer for processing imaging data that is also used to control an X-ray microscope. In another example, the processing module 106 can be incorporated into an individual computer that accesses, via a network-accessible database, imaging data supplied from a separate CT scanner or X-ray microscope.

Figure 2:
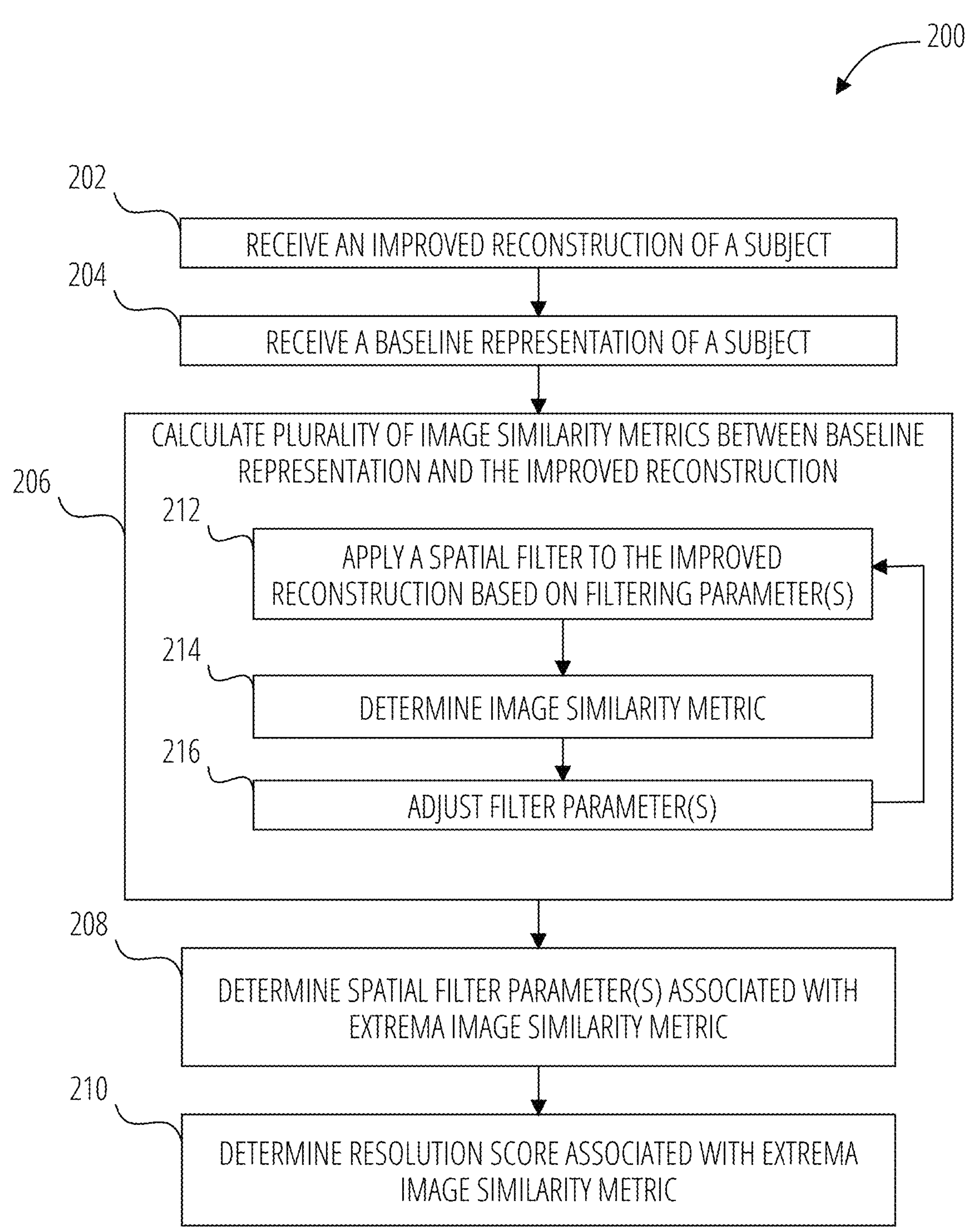
FIG. 2 is a flowchart depicting a process for evaluating resolution recovery of a trained neural network, according to certain aspects of the present disclosure.

FIG. 2 is a flowchart depicting a process 200 for evaluating resolution recovery of a trained neural network, according to certain aspects of the present disclosure. Process 200 can be performed using any suitable hardware, such as processing module 106 of FIG. 1. In some cases, process 200 is especially suited for handling X-ray imaging data and reconstructions, although that need not always be the case.

At block 202, an improved reconstruction of a subject is received. The improved reconstruction having been improved by application of a neural network to imaging data (e.g., raw imaging data) or a reconstruction (e.g., a 2-dimensional or 3-dimensional reconstruction from raw imaging data). In some cases, receiving the improved reconstruction at block 202 includes receiving imaging data or a reconstruction and applying a neural network to the received imaging data or reconstruction. The improved reconstruction can be of a subject (e.g., an object or sample imaged to generate the raw imaging data used to generate the improved reconstruction). The improved reconstruction can be associated with a particular neural network (e.g., a particular neural network itself, particular parameters for a neural network, and/or particular actions or orders of operation associated with processing imaging data using the neural network).

At block 204, a baseline representation of the subject is received. The baseline representation can be a reconstruction (e.g., a reconstruction based on the same imaging data used to generate the improved reconstruction and/or other imaging data of the same subject), although that need not always be the case. In some case, the baseline representation is a model of the subject, such as a 2-dimensional or 3-dimensional digital model of the subject.

In some cases, baseline representation is a reconstruction based on the same imaging data as that used to generate the improved reconstruction of block 202, however being processed with a best-in-class neural network.

In some cases, the baseline representation is a reconstruction based on more accurate imaging data (e.g., higher resolution imaging data) acquired of the same subject.

At block 206, a plurality of image similarity metrics is calculated between the baseline representation and the improved reconstruction. Calculating an image similarity metric can include applying a spatial filter to the improved reconstruction at block 212 and determining an image similarity metric between the filtered improved reconstruction and the baseline representation at block 214. The effect of the spatial filter can be adjusted by adjusting one or more filter parameters. Thus, depending on the value(s) of the filter parameter(s), the filtered improved reconstruction will have a higher or lower image similarity metric. After an image similarity metric has been calculated, the filter parameter(s) can be adjusted at block 216 before applying the spatial filter to the improved reconstruction to calculate the next image similarity metric. This process can repeat until all image similarity metrics are calculated. Adjusting the filter parameter at block 216 need not occur after the final image similarity metric is calculated.

Calculating image similarity metrics at block 206 can continue until a end condition is met. The end condition can be any suitable end condition, such as (i) stopping when the number of image similarity metrics calculated reaches a preset limit; (ii) stopping when the filter parameter(s) reach a preset limit; (iii) stopping when the previous n image similarity metrics meet a preset condition (e.g., the previous n image similarity metrics show that an extrema has been passed).

In some cases, calculating the image similarity metrics at block 206 can proceed sequentially through a range of filter parameters to generate a uniform set of image similarity metrics. In some cases, calculating the image similarity metrics at block 206 can proceed through a random set of filter parameters until sufficient image similarity metrics have been calculated to reliably identify an extrema. In some cases, calculating the image similarity metrics at block 206 can proceed by adjusting the filter parameters according to an optimized search function, such as a gradient descent search function, until an extrema image similarity metric is identified.

The output of block 206 will be one or more image similarity metrics including an extrema image similarity metric. The extrema image similarity metric is the minimum (or maximum, depending on the nature of the image similarity metric) image similarity metric in the plurality of image similarity metrics.

At block 208, one or more spatial filter parameters associated with the extrema image similarity metric is determined. Determining the one or more spatial filter parameters includes identifying which spatial filter parameter(s) were used to generate the filtered improved reconstruction that achieved the extrema image similarity metric.

At block 210, a resolution score associated with the extrema image similarity metric is determined. In some cases, determining the resolution score can include merely using the spatial filter parameter(s) as the resolution score. In some cases, determining the resolution score can be a calculation based on the spatial filter parameter(s). In some cases, the resolution score is a length scale associated with the spatial filter parameter(s). In some cases, the resolution score is a resolution associated with a length scale that is associated with the spatial filter parameter(s). In some cases, the resolution score is a relative value indicative of the relative location of the spatial filter parameter(s) with respect to the spatial filter parameter(s) associated with extrema image similarity metrics of other improved reconstructions (e.g., associated with other neural networks).

In some cases, determining the resolution score can include presenting the resolution score, such as using an input/output device (e.g., input/output module 108 of FIG. 1). In some cases, determining the resolution score at block 210 can include taking other action based on the resolution score, such as automatically selecting a particular neural network for future use. A neural network can be automatically selected for future use based on various conditions, such as (i) the neural network with the best resolution score; (ii) any neural network achieving at least a threshold resolution score; (iii) based on a resolution score and computational expense (e.g., time, money, processing power, etc.), such as to select a neural network that perform only slightly less effectively than another neural network that requires significantly more time to compute; and the like.

While process 200 is depicted with certain blocks in a certain order, in some cases process 200 can include fewer or additional blocks, or blocks in other orders. For example, in some cases process 200 can exclude block 208 and merely return a resolution score based on a relative position of the extrema with respect to the extrema of other neural networks. In another example, in some cases block 206 can include calculating some or all of the plurality of image similarity metrics in parallel.

Figure 3:
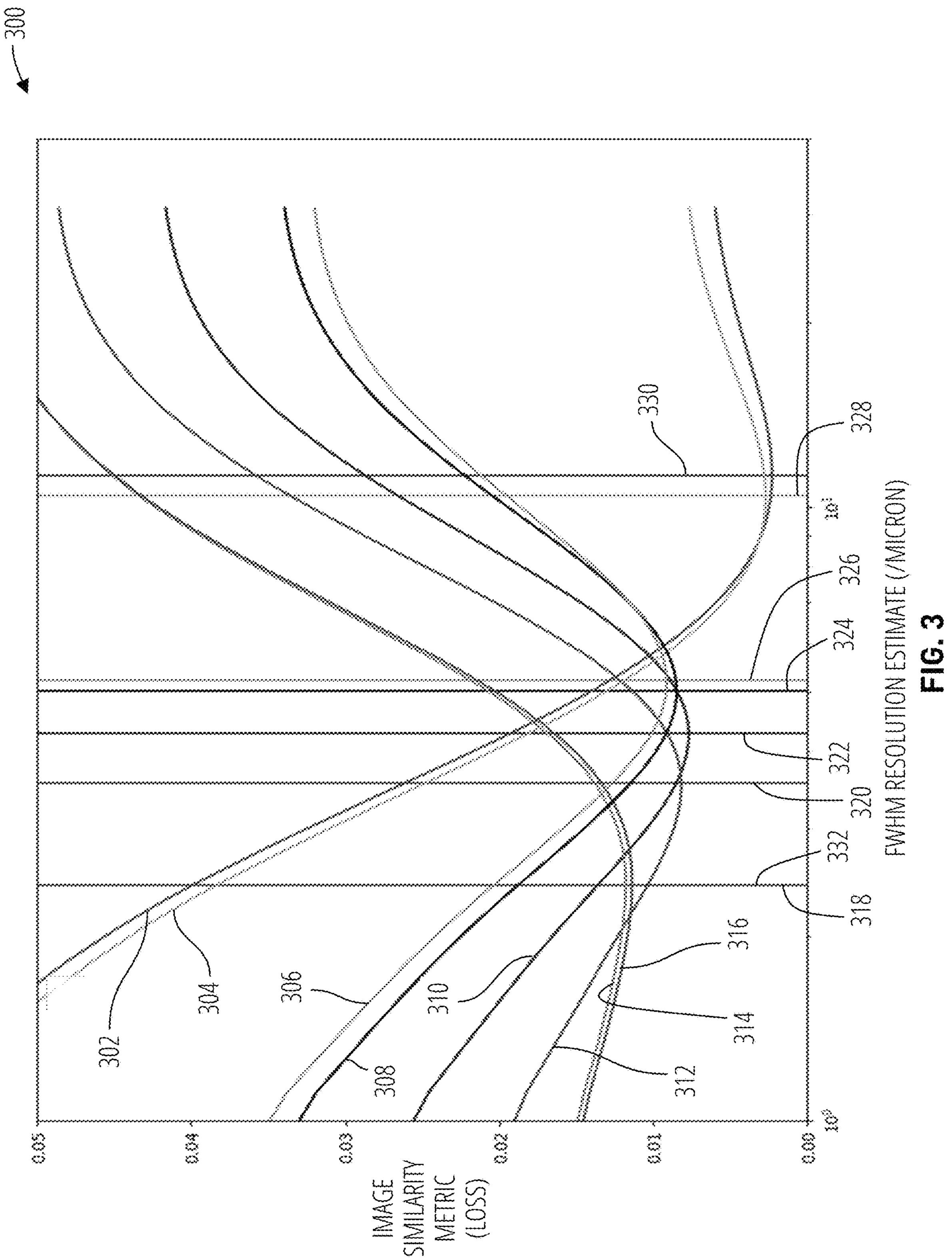
FIG. 3 is a chart depicting image similarity metric curves for a set of candidate pre-trained neural networks, according to certain aspects of the present disclosure.

FIG. 3 is a chart 300 depicting image similarity metric curves for a set of candidate pre-trained neural networks, according to certain aspects of the present disclosure. Each of the image similarity metrics calculated to create the image similarity metric curves in chart 300 can be calculated as described herein, such as according to process 200.

Each of the image similarity metric curves is associated with a unique neural network arrangement. Each image similarity metric curve was calculated by comparing filtered (across a range of filter parameters) reconstructions generated using the associated neural network arrangement with a baseline representation. The baseline representation was a reconstruction generated by a best-in-class neural network. Specifically, the best-in-class neural network used here was a neural network trained to take reconstructions of imaging data at a low-resolution and output a higher-resolution reconstruction, the neural network being trained using input data with a resolution of 1 micron.

Curve 302 is associated with a neural network trained to take reconstructions of imaging data at a low-resolution and output a higher-resolution reconstruction. The neural network associated with curve 302 was trained using input data with a resolution of 9 microns. The minimum of curve 302 is denoted by line 330.

9 microns discussed above referrers to a voxel size where the x axis on the plot is the resolution estimate coming from the differential blurring. There is also a difference between the nominal voxel size (the inferred voxel size from the magnification of the detector) and the voxel size actually used for reconstruction, as well as the way data is trained. For example:

302: Input data: Low resolution (9 um nominal). Reconstruction Strategy: DeepRecon, reconstructed on the 9 um grid. Training strategy: Train on all the data available on the 9 um reconstruction. Details of Curve 302 is discussed above.

304: Input data: Low resolution (9 um nominal). Reconstruction Strategy: DeepRecon, reconstructed on the 9 um grid. Training strategy: Trained only on data available to the 1 um (high resolution) reconstruction.

Curve 304 is associated with a neural network trained to take reconstructions of imaging data on a high-resolution grid and output a higher-quality reconstruction of that already high-resolution grid. The neural network associated with curve 304 was trained using input data with a resolution of 9 microns. The minimum of curve 304 is denoted by line 328.

306: Input data: Low resolution (9 um nominal), medium resolution (3 um nominal). Reconstruction Strategy: DeepScout (advanced reconstruction technology algorithm by ZEISS), Reconstructed on the 9 um grid, resampled onto the 3 um grid. Training strategy: Trained to recover 3 um features from 9 um data.

Curve 306 is associated with a neural network trained to take reconstructions of imaging data on a low-resolution grid and output a higher-resolution reconstruction. The neural network associated with curve 306 was trained using small field-of-view inputs with resolutions of 9 microns and 3 microns with the goal of improving a larger field-of-view input (e.g., from the same imaging data) from a resolution of 9 microns to 3 microns. The minimum of curve 306 is denoted by line 326.

308: Input data: Low resolution (9 um nominal). Reconstruction Strategy: DeepScout, reconstructed on the 3 um grid. Training strategy: Trained to recover 3 um features from 9 um data.

Curve 308 is associated with a neural network trained to take reconstructions of imaging data on a high-resolution grid and output a higher-quality reconstruction of that already high-resolution grid. The neural network associated with curve 308 was trained using small field-of-view inputs with resolutions of 9 microns and 3 microns with the goal of improving a larger field-of-view input (e.g., from the same imaging data) from a resolution of 9 microns to 3 microns. The minimum of curve 308 is denoted by line 324.

310: Input data: Medium resolution (3 um nominal). Reconstruction Strategy: DeepRecon, reconstructed on the 3 um grid. Training strategy: Trained on all the data available on the 3 um reconstruction.

Curve 310 is associated with a neural network trained to take reconstructions of imaging data at a low-resolution and output a higher-resolution reconstruction. The neural network associated with curve 310 was trained using input data with a resolution of 3 microns. The minimum of curve 310 is denoted by line 322.

312: Input data: Medium resolution (3 um nominal). Reconstruction Strategy: DeepRecon, reconstructed on the 3 um grid. Training strategy: Trained only on data available to the 1 um (high resolution) reconstruction.

Curve 312 is associated with a neural network trained to take reconstructions of imaging data on a high-resolution grid and output a higher-quality reconstruction of that already high-resolution grid. The neural network associated with curve 312 was trained using input data with a resolution of 3 microns. The minimum of curve 312 is denoted by line 320.

314: Input data: Medium resolution (3 um nominal). Reconstruction Strategy: DeepScout, reconstructed on the 1 um grid. Training strategy: Trained to recover 1 um features from 3 um data.

Curve 314 is associated with a neural network trained to take reconstructions of imaging data on a high-resolution grid and output a higher-quality reconstruction of that already high-resolution grid. The neural network associated with curve 314 was trained using small field-of-view inputs with resolutions of 3 microns and 1 microns with the goal of improving a larger field-of-view input (e.g., from the same imaging data) from a resolution of 3 microns to 1 microns. The minimum of curve 314 is denoted by line 332.

316: Input data: Medium resolution (3 um nominal). Reconstruction Strategy: DeepScout, reconstructed on the 3 um grid, linearly resampled onto the 1 um grid. Training strategy: Trained to recover 1 um features from 3 um data.

Curve 316 is associated with a neural network trained to take reconstructions of imaging data on a low-resolution grid and output a higher-resolution reconstruction. The neural network associated with curve 316 was trained using small field-of-view inputs with resolutions of 3 microns and 1 microns with the goal of improving a larger field-of-view input (e.g., from the same imaging data) from a resolution of 3 microns to 1 microns. The minimum of curve 316 is denoted by line 318. Notably, line 332 and line 318 are so close as to be visually indistinguishable, although line 322 is slightly lower in resolution than 318.

Each of the datasets that are not already on the 1 um grid are resampled onto the 1 um grid. Thereafter, each of the 1 um grid datasets are blurred and the loss computed relative to the 1 um DeepRecon dataset.

The true image resolution is then computed using the nominal resolution of the baseline image (1 um) and multiplying this by the sigma value (in voxels) of the dataset analyzed using differential blurring. This then is converted into a FWHM of the gaussian kernel by multiplying by 2.355 (Full width at half maximum-Wikipedia), as a resolution measure.

The y-axis of chart 300 represents an image similarity metric, here an amount of “loss,” which can be based on a image similarity distance. The x-axis of chart 300 represents different values for the filter parameter(s). Here, the x-axis is represented by a full width half maximum (FWHM) resolution estimate associated with the different values for the filter parameter(s), based on the length scale associated with the filter parameter(s). A FWHM resolution is a representation of spatial resolution corresponding to the width of possible locations of an electromagnetic source when the detected count rate is half of its maximum. In other words, a higher FWHM represents more possible locations, and thus a lower resolution. Therefore, a point towards the left side of chart 300 is higher in resolution than a point towards the right side of chart 300.

As seen in chart 300, the neural network arrangement associated with curve 316 results in the best resolution recovery out of all the other compared neural network arrangements.

Figure 4:
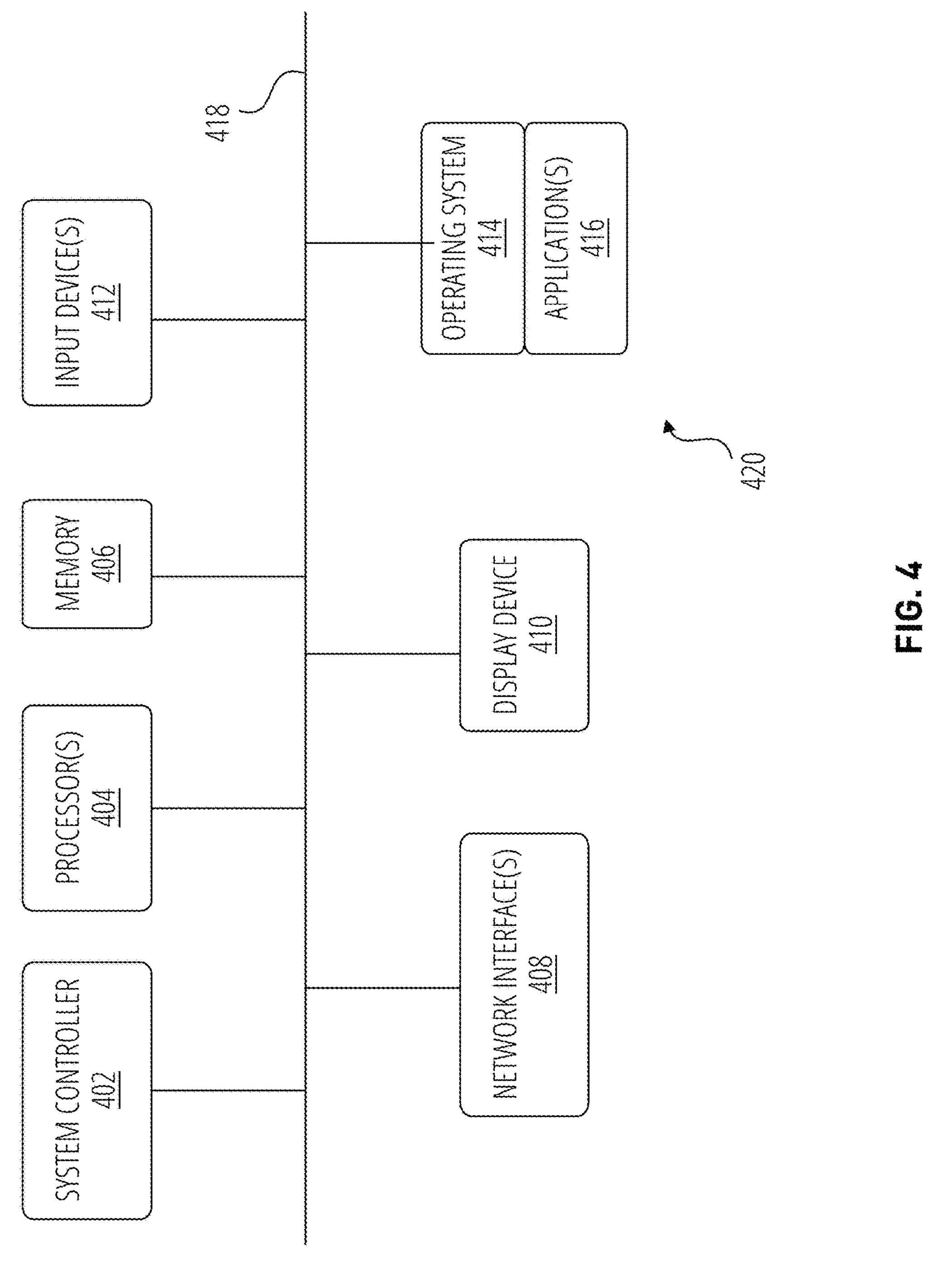
FIG. 4 is a block diagram of an example system architecture for implementing features and processes of the present disclosure.

FIG. 4 is a block diagram of an example system architecture 400 for implementing features and processes of the present disclosure, such as those presented with reference to process 200 of FIG. 2. The features and processes disclosed herein can be implemented using one or multiple instances of 400. The system architecture 400 can be used to implement a server (e.g., a cloud-accessible server), a user device (e.g., a smartphone or personal computer), or any other suitable device for performing some or all of the aspects of the present disclosure. The system architecture 400 can be implemented on any electronic device that runs software applications derived from compiled instructions, including without limitation personal computers, servers, smart phones, electronic tablets, game consoles, email devices, imagers (e.g., imaging machines, such as X-ray microscopes and CT scanners) and the like. In some implementations, the system architecture 400 can include one or more processors 404, one or more input devices 412, one or more display devices 410, one or more network interfaces 408, and one or more computer-readable media 420. Each of these components can be coupled by bus 418.

Display device 410 can be any known display technology, including but not limited to display devices using Liquid Crystal Display (LCD) or Light Emitting Diode (LED) technology. Processor(s) 404 can use any known processor technology, including but not limited to graphics processors and multi-core processors. Input device 412 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 418 can be any known internal or external bus technology, including but not limited to ISA, EISA, PCI, PCI Express, NuBus, USB, Serial ATA or Fire Wire.

Computer-readable medium 420 can be any medium that participates in providing instructions to processor 404 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 420 can include various instructions for implementing operating system 414 and applications 416 such as computer programs. The operating system 414 can be multi-user, multiprocessing, multitasking, multithreading, real-time and the like. The operating system 414 performs basic tasks, including but not limited to: recognizing input from input device 412; sending output to display device 410; keeping track of files and directories on computer-readable medium 420; controlling peripheral devices (e.g., storage drives, interface devices, etc.) which can be controlled directly or through an I/O controller; and managing traffic on bus 418. Computer-readable medium 420 can include various instructions for implementing firmware processes, such as a BIOS. Computer-readable medium 420 can include various instructions for implementing any of the processes described herein, including at least process 200 of FIG. 2.

Memory 406 can include high-speed random access memory and/or non-volatile memory, such as one or more magnetic disk storage devices, one or more optical storage devices, and/or flash memory (e.g., NAND, NOR). The memory 406 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 406 can store an operating system, such as Darwin, RTXC, LINUX, UNIX, OS X, WINDOWS, or an embedded operating system such as VxWorks.

System controller 402 can be a service processor that operates independently of processor 404. In some implementations, system controller 402 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

One or more elements or aspects or steps, or any portion(s) thereof, from one or more of any of the claims below can be combined with one or more elements or aspects or steps, or any portion(s) thereof, from one or more of any of the other claims below or combinations thereof, to form one or more additional implementations and/or claims of the present disclosure.

What is claimed is:

1. A method, comprising:

receiving an improved reconstruction of a subject, the improved reconstruction generated by supplying a trained neural network with first imaging data acquired of the subject, the first imaging data acquired using an electromagnetic radiation imager;

receiving a baseline representation of the subject;

calculating a plurality of image similarity metrics between the baseline representation and the improved reconstruction, wherein, for each of the plurality of image similarity metrics, calculating the plurality of image similarity metrics includes:

applying a spatial filter to the improved reconstruction based at least in part on a filter parameter;

calculating an image similarity metric between the baseline representation and the filtered improved reconstruction; and adjusting the filter parameter;

determining a selected filter parameter associated with an extrema image similarity metric of the plurality of image similarity metrics representative of a closest similarity between the baseline representation and the filtered improved reconstruction; and generating a resolution score associated with the selected filter parameter.

2. The method of claim 1, wherein the resolution score is a length scale value associated with the selected filter parameter.

3. The method of claim 1, the improved reconstruction is a volumetric reconstruction.

4. The method of claim 1, wherein the spatial filter is a low-pass filter.

5. The method of claim 1, wherein applying the spatial filter includes applying a Gaussian filter to the improved reconstruction, the filter parameter including a variance of the Gaussian filter.

6. The method of claim 1, wherein the image similarity metric is an image similarity distance, and wherein the extrema image similarity metric is a minimum image similarity metric of the plurality of image similarity metrics.

7. The method of claim 1, wherein the image similarity metric includes (i) a mean square error; (ii) a mean absolute error; (iii) a normalized correlation; (iv) a pattern intensity; (v) a measurement of mutual information; or (vi) any combination of (i) to (v).

8. The method of claim 1, wherein the spatial filter is a band-pass filter.

9. The method of claim 1, wherein applying the spatial filter includes applying a difference of Gaussians (DoG) filter, the filter parameter including a pair of variances of the DoG filter.

10. The method of claim 9, wherein determining the image similarity metric includes computing a distance between the improved reconstruction and the baseline representation based at least in part on an output of the DOG filter.

11. The method of claim 1, wherein the baseline representation is a volumetric reconstruction generated from second imaging data acquired of the subject, the second imaging data having a higher resolution than the first imaging data.

12. The method of claim 11, wherein the first imaging data is acquired using a first set of operating parameters, and wherein the second imaging data is acquired using the electromagnetic radiation imager using a second set of operating parameters.

13. The method of claim 1, wherein the first imaging data is x-ray imaging data and the electromagnetic radiation imager is an x-ray imager.

14. The method of claim 1, further comprising:

associating the resolution score with the trained neural network;

comparing the resolution score associated with the trained neural network with an additional resolution score associated with an additional trained neural network; and selecting the trained neural network for future use based at least in part on the comparison of the resolution score and the additional resolution score.

15. The method of claim 14, further comprising:

receiving third imaging data; and generating, in response to selecting the trained neural network, improved third imaging data by applying the trained neural network to the third imaging data.

16. The method of claim 1, further comprising:

associating the resolution score with the trained neural network;

determining, for each of a plurality of additional trained neural networks, a respective additional resolution score; and presenting a display, the display including an indication of the resolution score in association with an indication of the trained neural network, and, for each of the plurality of additional resolution scores, an indication of the respective additional resolution score in association with an indication of the respective additional trained neural network.

17. The method of claim 1, further comprising presenting a display, the display including a graphical depiction of the plurality of image similarity metrics.

18. The method of claim 17, further comprising: receiving one or more additional pluralities of image similarity metrics associated with one or more additional trained neural networks, wherein the display further includes, for each of the one or more additional pluralities of image similarity metrics, a graphical depiction of the respective additional plurality of image similarity metrics.

19. A system comprising:

a control system including one or more processors; and a memory having stored thereon machine readable instructions;

wherein the control system is coupled to the memory, and the method of claim 1 is implemented when the machine executable instructions in the memory are executed by at least one of the one or more processors of the control system.

20. A computer-program product tangibly embodied in a non-transitory machine-readable storage medium, including instructions configured to cause a data processing apparatus to perform the method of claim 1.

* * * * *